United States Patent
Koskan et al.

(10) Patent No.: US 9,957,435 B2
(45) Date of Patent: May 1, 2018

(54) METHODS FOR INHIBITING IRON SULFIDE SCALE IN OIL WELLS

(71) Applicant: GLOBAL GREEN PRODUCTS LLC, Dover, DE (US)

(72) Inventors: Larry P. Koskan, Orland Park, IL (US); Barbara E. Moriarty, Island Lake, IL (US); Abdul R. Meah, Bridgeview, IL (US)

(73) Assignee: GLOBAL GREEN PRODUCTS LLC, Dover, DE (US)

( * ) Notice: Subject to any disclaimer, the term of this patent is extended or adjusted under 35 U.S.C. 154(b) by 11 days.

(21) Appl. No.: 15/136,163

(22) Filed: Apr. 22, 2016

(65) Prior Publication Data

US 2016/0312104 A1 Oct. 27, 2016

Related U.S. Application Data

(60) Provisional application No. 62/151,068, filed on Apr. 22, 2015.

(51) Int. Cl.
*C09K 8/532* (2006.01)
*C10G 75/04* (2006.01)

(52) U.S. Cl.
CPC .............. *C09K 8/532* (2013.01); *C10G 75/04* (2013.01); *C09K 2208/20* (2013.01)

(58) Field of Classification Search
None
See application file for complete search history.

(56) References Cited

U.S. PATENT DOCUMENTS

| 9,382,466 B2 * | 7/2016 | Koskan .................. E21B 43/26 |
| 9,605,197 B2 * | 3/2017 | Koskan .................. E21B 43/26 |
| 2008/0272342 A1 * | 11/2008 | Guzmann ................ C02F 5/12 252/392 |
| 2009/0151944 A1 * | 6/2009 | Fuller ..................... C09K 8/536 166/280.2 |
| 2013/0248186 A1 * | 9/2013 | Koskan .................. E21B 43/26 166/304 |

FOREIGN PATENT DOCUMENTS

| EP | 0662504 A1 | 7/1995 |
| WO | 0075399 A2 | 12/2000 |
| WO | 2013130884 A1 | 9/2013 |
| WO | 2013152832 A1 | 10/2013 |

* cited by examiner

*Primary Examiner* — John J Figueroa
(74) *Attorney, Agent, or Firm* — Seager, Tufte & Wickhem, LLP

(57) ABSTRACT

Formulations and method for preventing and inhibiting the formation of iron sulfide in hydrocarbon producing wells are disclosed. The methods may include treating at least one of an oil well, a production fluid, and downstream field equipment with an additive including a DL-aspartic acid polymer. Other formulations and methods are disclosed including methods for reducing microbial counts in hydrocarbon producing wells and/or methods for dispersing iron sulfide in hydrocarbon producing wells.

20 Claims, 1 Drawing Sheet

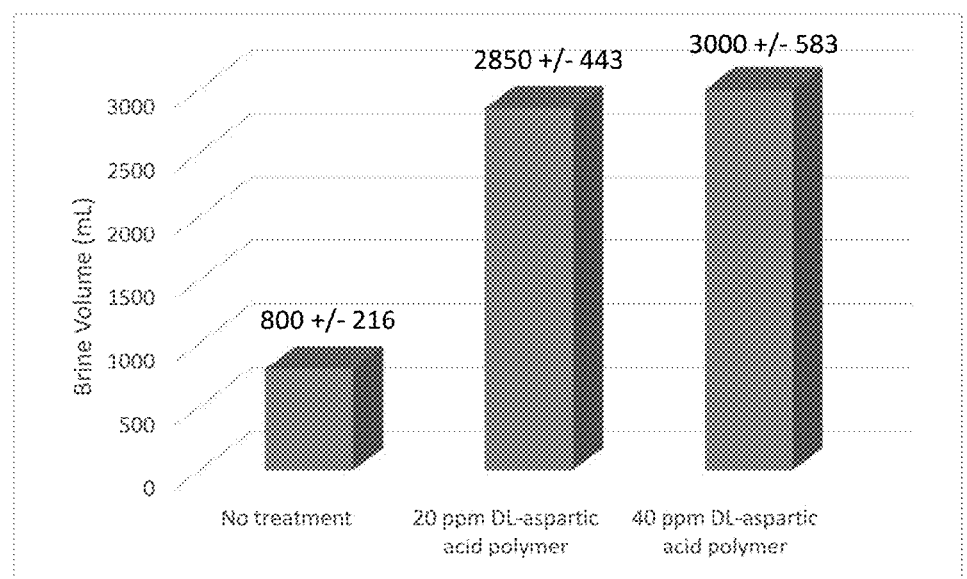

METHODS FOR INHIBITING IRON SULFIDE SCALE IN OIL WELLS

CROSS-REFERENCE TO RELATED APPLICATIONS

This application claims priority under 35 U.S.C. § 119 to U.S. Provisional Application Ser. No. 62/151,068, filed Apr. 22, 2015, the entirety of which is incorporated herein by reference.

TECHNICAL FIELD

The present disclosure relates generally to inhibiting the formation of iron sulfide in hydrocarbon producing wells.

BACKGROUND

Particularly in oil production, as much or more water can be produced as the hydrocarbons themselves. This water is often referred to as formation water or produced water and contains many dissolved mineral ions such as sodium, calcium, barium, strontium, zinc, lead and iron to name a few. Because most of these waters are high in sodium and chloride, they are referred to as brines. When brines change temperature or pH or are mixed with other waters containing carbonates and sulfates, a variety of mineral precipitates or scales occur. Such common scales as calcium carbonate, calcium sulfate, barium sulfate and strontium sulfate regularly occur. These scales can become so severe that they will plug, reduce and eventually block production from the well.

Particularly troublesome is the quick formation of iron sulfide (FeS) scales. These hard scales become voluminous, buildup on equipment surfaces, promote underdeposit corrosion and plug wells and all associated field equipment, including treaters, separators pipes, evaporators and desalters. Sulfides are normally generated from the presence of hydrogen sulfide gas, either naturally from the formation, known as sour gas, or from indigenous bacteria spread throughout the well from the drilling process. This bacteria is referred to sulfate reducing bacteria and through their metabolic process convert sulfates into hydrogen sulfide gas. Acidizing treatments to dissolve sulfide and other scales may also create hydrogen sulfide gas further mitigating the process.

BRIEF SUMMARY

The present disclosure relates generally to inhibiting the formation of iron sulfide in hydrocarbon producing wells. An example method for preventing and inhibiting the formation of iron sulfide in hydrocarbon producing wells is disclosed. The method comprises:

treating the oil well, production fluid and downstream field equipment with an additive comprised of DL-aspartic acid polymer.

Alternatively or additionally to any of the embodiments above, the monomer used in the polymer is L-aspartic acid.

Alternatively or additionally to any of the embodiments above, the polymer is an $\alpha,\beta$, dl-aspartic acid polymer.

Alternatively or additionally to any of the embodiments above, the polymer is produced from ammonia and maleic acid.

Alternatively or additionally to any of the embodiments above, the polymer is produced from polysuccinimide.

Alternatively or additionally to any of the embodiments above, the aspartic acid-containing polymer is an amine derivative of aspartic acid.

Alternatively or additionally to any of the embodiments above, the amine is a primary amine.

Alternatively or additionally to any of the embodiments above, the aspartic acid-containing polymer is a block copolymer or a co-polycondensates with condensable moities.

Alternatively or additionally to any of the embodiments above, the polymer is in the alkali metal salt form.

Alternatively or additionally to any of the embodiments above, the polymer has a weight average molecular weight of 1,000-100,000 Daltons.

Alternatively or additionally to any of the embodiments above, the polymer has a weight average molecular weight of 5,000-15,000 Daltons.

Alternatively or additionally to any of the embodiments above, the polymer has a weight average molecular weight of 8,000-11,000 Daltons.

Alternatively or additionally to any of the embodiments above, the polymer-containing formulation is designed to be fed at a dosage of 10-1000 ppm.

Alternatively or additionally to any of the embodiments above, the polymer-containing formulation is designed to be fed at a dosage of 25-500 ppm.

Alternatively or additionally to any of the embodiments above, the polymer-containing formulation is designed to be fed at a dosage of 50-300 ppm.

A method for dispersing the formation of iron sulfide in a well is disclosed. The method comprises: disposing a formulation in a hydrocarbon producing wells comprising treating the oil well, production fluid and downstream field equipment with an additive comprised of DL-aspartic acid polymer Alternatively or additionally to any of the embodiments above, the monomer used in the polymer is L aspartic acid.

Alternatively or additionally to any of the embodiments above, the polymer is an $\alpha,\beta$, dl-aspartic acid polymer.

Alternatively or additionally to any of the embodiments above, the polymer is produced from ammonia and maleic acid.

Alternatively or additionally to any of the embodiments above, the polymer is produced from polysuccinimide.

Alternatively or additionally to any of the embodiments above, the aspartic acid-containing polymer is an amine derivative of aspartic acid.

Alternatively or additionally to any of the embodiments above, the amine is a primary amine.

Alternatively or additionally to any of the embodiments above, the aspartic acid-containing polymer is a block copolymer or a co-polycondensates with condensable moities.

Alternatively or additionally to any of the embodiments above, the polymer is in the alkali metal salt form.

Alternatively or additionally to any of the embodiments above, the polymer has a weight average molecular weight of 1,000-100,000 Daltons.

Alternatively or additionally to any of the embodiments above, the polymer has a weight average molecular weight of 5,000-15,000 Daltons.

Alternatively or additionally to any of the embodiments above, the polymer has a weight average molecular weight of 8,000-11,000 Daltons.

Alternatively or additionally to any of the embodiments above, disposing a formulation in a well includes disposing the formulation in the well at a dose of 10-1000 ppm.

Alternatively or additionally to any of the embodiments above, disposing a formulation in a well includes disposing the formulation in the well at a dose of 25-500 ppm Alternatively or additionally to any of the embodiments above, disposing a formulation in a well includes disposing the formulation in the well at a dose of 50-300 ppm.

A method for preventing and inhibiting the formation of iron sulfide in hydrocarbon producing wells is disclosed. The method comprises treating the oil well, production fluid and downstream field equipment with an additive comprised of DL-aspartic acid polymer and a weak organic acid such as acetic acid, oxalic acid, lactic acid, citric acid, uric acid or benzoic acid in water Alternatively or additionally to any of the embodiments above, the monomer used in the polymer is L aspartic acid.

Alternatively or additionally to any of the embodiments above, the polymer is an $\alpha,\beta$, dl-aspartic acid polymer.

Alternatively or additionally to any of the embodiments above, the polymer is produced from ammonia and maleic acid.

Alternatively or additionally to any of the embodiments above, the polymer is produced from polysuccinimide.

Alternatively or additionally to any of the embodiments above, the aspartic acid-containing polymer is an amine derivative of aspartic acid.

Alternatively or additionally to any of the embodiments above, the amine is a primary amine.

Alternatively or additionally to any of the embodiments above, the aspartic acid-containing polymer is a block copolymer or a co-polycondensates with condensable moities.

Alternatively or additionally to any of the embodiments above, the aspartic acid-containing polymer is an amine derivative of aspartic acid, a block copolymer, a co-polycondensates with an amine.

Alternatively or additionally to any of the embodiments above, the polymer is in the alkali metal salt form.

Alternatively or additionally to any of the embodiments above, the polymer has a weight average molecular weight of 1,000-100,000 Daltons.

Alternatively or additionally to any of the embodiments above, the polymer has a weight average molecular weight of 5,000-15,000 Daltons.

Alternatively or additionally to any of the embodiments above, the polymer has a weight average molecular weight of 8,000-11,000 Daltons.

Alternatively or additionally to any of the embodiments above, the polymer-containing formulation is designed to be fed at a dose of 10-1000 ppm.

Alternatively or additionally to any of the embodiments above, the polymer-containing formulation is designed to be fed at a dose of 25-500 ppm.

Alternatively or additionally to any of the embodiments above, the polymer-containing formulation is designed to be fed at a dose of 50-300 ppm.

A method for preventing and inhibiting the formation of iron sulfide in hydrocarbon producing wells is disclosed. The method comprises treating the oil well, production fluid and downstream field equipment with an additive comprised of DL-aspartic acid polymer and a citric acid in water.

Alternatively or additionally to any of the embodiments above, the monomer used in the polymer is L aspartic acid.

Alternatively or additionally to any of the embodiments above, the polymer is an $\alpha,\beta$, dl-aspartic acid polymer.

Alternatively or additionally to any of the embodiments above, the polymer is produced from ammonia and maleic acid.

Alternatively or additionally to any of the embodiments above, the polymer is produced from polysuccinimide.

Alternatively or additionally to any of the embodiments above, the aspartic acid-containing polymer is an amine derivative of aspartic acid.

Alternatively or additionally to any of the embodiments above, the amine is a primary amine.

Alternatively or additionally to any of the embodiments above, the aspartic acid-containing polymer is a block copolymer or a co-polycondensates with condensable moities.

Alternatively or additionally to any of the embodiments above, the aspartic acid-containing polymer is an amine derivative of aspartic acid, a block copolymer, a co-polycondensates with an amine.

Alternatively or additionally to any of the embodiments above, the polymer is in the alkali metal salt form.

Alternatively or additionally to any of the embodiments above, the polymer has a weight average molecular weight of 1,000-100,000 Daltons.

Alternatively or additionally to any of the embodiments above, the polymer has a weight average molecular weight of 5,000-15,000 Daltons.

Alternatively or additionally to any of the embodiments above, the polymer has a weight average molecular weight of 8,000-11,000 Daltons.

Alternatively or additionally to any of the embodiments above, the polymer-containing formulation is designed to be fed at a dose of 10-1000 ppm.

Alternatively or additionally to any of the embodiments above, the polymer-containing formulation is designed to be fed at a dose of 25-500 ppm.

Alternatively or additionally to any of the embodiments above, the polymer-containing formulation is designed to be fed at a dose of 50-300 ppm.

A method for reducing microbial counts in a well comprising disposing a formulation in a hydrocarbon producing wells is disclosed. The method comprises treating the oil well, production fluid and downstream field equipment with an additive comprised of DL-aspartic acid polymer.

Alternatively or additionally to any of the embodiments above, the monomer used in the polymer is L aspartic acid.

Alternatively or additionally to any of the embodiments above, the polymer is an $\alpha,\beta$, dl-aspartic acid polymer.

Alternatively or additionally to any of the embodiments above, the polymer is produced from ammonia and maleic acid.

Alternatively or additionally to any of the embodiments above, the polymer is produced from polysuccinimide.

Alternatively or additionally to any of the embodiments above, the aspartic acid-containing polymer is an amine derivative of aspartic acid.

Alternatively or additionally to any of the embodiments above, the amine is a primary amine.

Alternatively or additionally to any of the embodiments above, the aspartic acid-containing polymer is a block copolymer or a co-polycondensates with condensable moities.

Alternatively or additionally to any of the embodiments above, the polymer is in the alkali metal salt form.

Alternatively or additionally to any of the embodiments above, the polymer has a weight average molecular weight of 1,000-100,000 Daltons.

Alternatively or additionally to any of the embodiments above, the polymer has a weight average molecular weight of 5,000-15,000 Daltons.

Alternatively or additionally to any of the embodiments above, the polymer has a weight average molecular weight of 8,000-11,000 Daltons.

Alternatively or additionally to any of the embodiments above, disposing a formulation in a well includes disposing the formulation in the well at a dosage of 10-1000 ppm Alternatively or additionally to any of the embodiments above, disposing a formulation in a well includes disposing the formulation in the well at a dosage of 25-500 ppm Alternatively or additionally to any of the embodiments above, disposing a formulation in a well includes disposing the formulation in the well at a dosage of 50-300 ppm.

A formulation for inhibiting the formation of iron sulfide in a well is disclosed. The formulation comprises an aspartic acid polymer solution, 40% in water.

Alternatively or additionally to any of the embodiments above, wherein the polymer has a weight average molecular weight of 2,000-25,000 Daltons.

Alternatively or additionally to any of the embodiments above, wherein the polymer has a weight average molecular weight of 9,000 Daltons.

Alternatively or additionally to any of the embodiments above, wherein the formulation is designed to be administered at a dose of 50-100 ppm.

A method for inhibiting the formation of iron sulfide in a well is disclosed. The method comprises:

disposing a formulation in a well, the formulation comprising an aspartic acid polymer solution, 40% in water.

Alternatively or additionally to any of the embodiments above, the polymer has a weight average molecular weight of 2,000-25,000 Daltons.

Alternatively or additionally to any of the embodiments above, the polymer has a weight average molecular weight of 9,000 Daltons.

Alternatively or additionally to any of the embodiments above, disposing a formulation in a well includes disposing the formulation in the well at a dose of 50-100 ppm.

A formulation for inhibiting the formation of iron sulfide in a well is disclosed. The formulation comprises:

an aspartic acid polymer, 10%, citric acid, 30% solution in water.

Alternatively or additionally to any of the embodiments above, the polymer has a weight average molecular weight of 2000-25000 Daltons.

Alternatively or additionally to any of the embodiments above, the polymer has a weight average molecular weight of 9,000 Daltons.

Alternatively or additionally to any of the embodiments above, the formulation is designed to be administered at a dose of 50-200 ppm.

A method for inhibiting the formation of iron sulfide in a well is disclosed. The method comprises:

disposing a formulation in a well, the formulation comprising an aspartic acid polymer, 10%, citric acid, 30% solution in water.

Alternatively or additionally to any of the embodiments above, the polymer has a weight average molecular weight of 2,000-25,000 Daltons.

Alternatively or additionally to any of the embodiments above, the polymer has a weight average molecular weight of 9,000 Daltons.

Alternatively or additionally to any of the embodiments above, disposing a formulation in a well includes disposing the formulation in the well at a dose of 50-200 ppm.

A method for reducing microbial counts in a well is disclosed that comprises disposing a formulation in a well, the formulation comprising an aspartic acid polymer solution, 40% in water.

A method for reducing microbial counts in a well is disclosed that comprises disposing a formulation in a well, the formulation comprising an aspartic acid polymer, 10%, citric acid, 30% solution in water.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description in connection with the accompanying drawings, in which:

FIG. 1 illustrates an increase in Millipore Filtration Volume in the presence of DL aspartic acid polymer.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following detailed description should be read with reference to the drawings in which similar elements in different drawings are numbered the same. The drawings, which are not necessarily to scale, depict illustrative embodiments and are not intended to limit the scope of the disclosure.

During oil production, one scale that can form is iron sulfide (FeS). Iron sulfide is formed from the interaction of iron (whether the iron is from the formation or is from corrosion) and sulfide (especially in sour systems or from sulfate reducing bacteria). The formation of iron sulfide is given in the formula below.

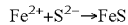

$$Fe^{2+} + S^{2-} \rightarrow FeS$$

The formation of iron sulfide can reduce the amount of oil produced, by building up inside well-bores. In addition, iron sulfide scale can result in increased corrosion through under-deposit corrosion. Iron sulfide can exist as a variety of forms including pyrrhotite ($Fe_{1-x}S$), troilite (FeS), mackinawite ($Fe_{1+x}S$), pyrite ($FeS_2$) and marcasite ($FeS_2$). As the search for oil results in higher pressures, the probability of a problem from iron sulfide becomes larger and indicates a need for iron sulfide inhibitors.

Generally, methods for inhibiting the formation and buildup of iron sulfide may involve minimizing the presence of either ferrous ion or sulfide ion. The use of chelants, such as ethylenediammine tetraacetic acid (EDTA), nitrilotri-acetic acid (NTA) or citric acid, can minimize the presence of iron ($Fe^{2+}$) through forming a complexation. Sulfide ($S^{2-}$) can be minimized by the use of $H_2S$ scavengers, such as acrolein.

Other methods that has been developed involve treating the wells, treaters and other field equipment with polymers. Polymers are chemicals prepared from one or more monomers and can be either homopolymers, copolymers, terpolymers or block polymers. Polymers can be characterized by their molecular weight and by the types of monomers used to make the polymer.

The disclosure pertains to methods to prevent the formation of iron sulfide scale and may include treating production fluid with an additive comprising a polymer of DL-aspartic acid. In another aspect, the disclosure pertains to a method to prevent already formed iron sulfide scale from adhering to oil field equipment comprising treating production fluid with an additive comprising a polymer of DL-aspartic acid. In still another aspect, the disclosure pertains to a method to prevent the formation of iron sulfide scale or disperse iron sulfide scale comprising treating the production fluid with an additive comprising a copolymer of α, β, dl-aspartic acid polymer.

The polymers of the disclosure have applicability in inhibiting and/or dispersing sulfides of zinc, lead and iron. The polymers of this disclosure also demonstrate the highest biodegradation rates when compared to all other traditional homopolymers, copolymers and terpolymers used for metal sulfide scale inhibition and/or dispersion.

It has also been discovered that treating production fluid with an additive comprising a polymer of DL-aspartic acid may help prevent sulfate reducing bacteria from producing hydrogen sulfide gas comprising. In one aspect, the disclosure is a method to reduce/control the microbial population in oil wells comprising treating production fluid with an additive comprising a polymer of DL-aspartic acid. In still another aspect, the disclosure is a method to prevent sulfate reducing bacteria from producing hydrogen sulfide gas comprising treating the production fluid with an additive comprising a copolymer of α,β, DL-aspartic acid polymer.

The disclosure pertains to a method of preventing and inhibiting the formation of iron sulfide scales. Although the example is for iron sulfide, other metal sulfides such as lead and zinc or a combination of iron, lead and/or zinc may be included. Iron sulfides may be in the form of troilite (FeS), pyrite ($FeS_2$), mackinawite ($Fe_9S_8$) or phyrrhotite ($Fe_7S_8$).

In one embodiment, the method of the disclosure, the well, field equipment or production fluid is treated with an additive comprising a polymer of DL-aspartic acid polymer. These polymers typically start with L-aspartic acid monomer, heated to form polysuccinimide and hydrolyzed to form the final DL-aspartic acid polymer.

In another embodiment, preparations of L-aspartic acid can be reacted alone or with an acid catalyst, such as phosphoric acid to produce polysuccinimide. The polysuccinimide can be further reacted with a base in water to form the final aspartic acid polymer. The non-catalyzed polymer has a molecular weight (MWwt) of about 5000 to about 3000 Daltons, is partially branched and is moderately biodegradable.

The catalyzed DL-aspartic acid polymer can obtain a broad range of molecular weights (MWwt) from about 500,000-3000 Daltons depending on the level of catalyst, is less than 1% branched and passes the OECD 306 sea water test for readily biodegradability. In one embodiment, these polymers have molecular weights (MWwt) from about 1,000 to 100,000 Daltons, or from about 5,000 to 100,000 Daltons, or about 5,000 to 50,000 Daltons, or about 5,000 to 15,000 Daltons, or about 8,000 to 11,000 Daltons.

Because L-aspartic acid is an optically active monomer, the heating conditions converts the monomer to the racemic DL-aspartic acid. D-aspartic acid can also be used to form polysuccinimide.

The hydrolysis step to convert polysuccinimide to the final aspartic acid polymer can use bases such a Na, K, Ba, $NH_4$ and Li hydroxides as well as amine bases.

In still another embodiment, aspartic acid polymers can be derived from the reaction of maleic acid and ammonia. Preparations of this reaction produce a polysuccinimide that can be hydrolyzed to the final aspartic acid polymer. These polymers have typically very low molecular weights (MWwt) in the range of 1000-2000 Daltons, highly branched and low biodegradability.

In another embodiment, the polysuccinimide can be hydrolyzed with primary amine bases to form derivatives useful as additives to inhibit and prevent the formation of iron sulfide in oil wells and downstream field equipment. These substituted amine DL-aspartic acid polymers should have applicability for dispersing already formed iron sulfide scale.

In still another embodiment, DL-aspartic acid polymers can be condensed with other acids or amines to form block polymers. These polymers develop very high molecular weights that are useful for providing dispersive properties especially in treating downstream field equipment.

In one aspect, DL-aspartic acid polymers are differentiated from other polymers used to either inhibit or disperse iron sulfide and by association, lead and zinc sulfides by their backbone structure. Most commercial polymers used to either inhibit or prevent the formation of iron sulfide have allylic based backbones based on acrylic, substituted acrylics or maleic monomer. These polymers can be either homopolymers, copolymers or terpolymers with a variety of side-chain functional groups but with a hydrocarbon, methyl or ethyl substituted hydrocarbon backbone.

In another aspect, these acrylic based polymers inhibit, prevent or disperse iron sulfide scales by using their functional groups to adsorb onto nucleate crystal surfaces thereby causing disturbances to crystal growth. It is known that the efficiency of these adsorption processes are poor.

The backbone of DL-aspartic acid polymers contain periodic amide groups where the amide nitrogen is active and involved in the adsorption process. These polymers have been referred to as pseudo-proteins or beta proteins due to their inherently similar structure to protein structures. These polymers also adsorb onto iron sulfide nucleate crystal surfaces but at a much more efficient rate due to the involvement of the backbone and their corresponding functional groups. This process inhibits the formation of iron sulfide scales in treated oil wells, production fluids and downstream field equipment.

The amount of additive useful in this disclosure necessary to effectively inhibit or prevent the formation of iron sulfide scale may be introduced into the oil well, production fluid or downstream equipment at a concentration from about 0.5 ppm to 5,000 ppm. In other embodiments the useful concentration may be from about 1-5,000 ppm, or about 1-1,000 ppm, or about 10-1,000 ppm, or about 25-500 ppm, or about 50-300 ppm, or about 50-100 ppm. In still other embodiments, the additive may be introduced directly into the oil well, production fluid or downstream field equipment.

In one embodiment, the method of inhibiting and preventing the formation of iron sulfide scale consisting of introducing a DL-aspartic acid polymer solution directly into the oil well, production fluid or downstream equipment. The concentration of polymer in the solution may be at a concentration of about 32% to about 45%. In another embodiment, the polymer may be a dry polymer dissolved on site in fresh water to concentrations ranging from about 5% to about 60%.

In still another embodiment, the polymer may be combined with compounds such as methanol and ethylene glycol, in different proportions, to allow the additive to be pumpable at very low temperatures. In another embodiment, the method of inhibiting and preventing the formation of iron sulfide scale with particularly high soluble iron ($Fe^{+2}$) by treating the production fluid with the polymer combined with other ingredients such as citric acid.

In one aspect, the method of inhibiting and preventing the formation of iron sulfide scale consisting of injecting an additive consisting of DL-aspartic acid polymer to an oil well, production fluid and/or downstream field equipment to control microbial growth of sulfate reducing bacteria (SRB). Typical biocides are employed to control microbial growth in order to prevent underdeposit corrosion. The costs of biocides to treat microbial growth is one of the largest chemical cost at the well system.

In one embodiment, the method of reducing the influence of sulfate reducing bacteria in oil field systems impacts the production of hydrogen sulfide gas and its potential to react with iron to form iron sulfide scale. In another embodiment, the method of reducing and/or controlling SRB growth consisting of treating a production fluid, oil well and/or downstream field equipment with an additive consisting of DL-aspartic acid polymer to reduce the number of counts as measured by the ATP field test method.

Generally, methods for preventing the buildup of FeS may involve preventing the formation of FeS and/or dispersing the previously formed FeS. In preventing the formation of FeS, one can either minimize the Fe' or minimize the $S^{2-}$. The use of chelants, such as ethylenediamine tetraacetic acid, disodium salt (EDTA) or citric acid, can reduce the iron through complexation. Alternatively, the amount of $S^{2-}$ can be reduced with $H_2S$ scavengers. Iron sulfide can also be dispersed by a polymer such as copolymers of acrylic acid. The term polymer may include homopolymers, copolymers and terpolymers.

Monomers for the polymer can be chosen from the acrylic acid, methacrylic acid, maleic acid and salts, maleic anhydride and salts, itaconic acid and salts, crotonic acid, aspartic acid, lactic acid, glutamic acid, acrylamide, methacrylamide, tertiary butyl acrylamide, sodium vinyl sulfonate, 2-methyl-2-propene-1-sulfonic acid, 2-acrylamide-2-methyl-1-propanesulfonic acid, diallyl dimethyl ammonium salt, hydroxypropyl acrylic acid, 3-(methylacrylamido)propyl trimethyl ammonium salt, 3-(acrylamide)propyltrimethyl-ammonium salt, dimethylaminoethyl methacrylate methyl salt, dimethylaminoethyl methacrylate dimethyl sulfate quaternary salt, dimethylaminoethyl acrylate dimethyl sulfate quaternary salt, dimethylaminoethyl acrylate methyl salt, vinyl acetate, vinyl alcohol, vinyl pyrollidone, N-vinyl lactam and N-vinyl-caprolactam.

Polymers can be either homopolymers or copolymers with a mole ratio of the two monomers from 0.1-99.9:99.9:0.1.

In at least some examples, formulations including a polymer are shown to inhibit the formation of iron sulfide. The polymer can be used from 0.5-1000 ppm and can be chosen to have a weight average molecular weight of 200 to 200,000 Daltons or about 2,000 to 25,000 Daltons.

In some instances, the formulation may be an aspartic acid polymer solution, 40% in water:weight average molecular weight 9,000 Daltons; dosage 50-100 ppm.

In some instances, the formulation may be an aspartic acid polymer, 10%, Citric Acid, 30% solution in water:polymer weight average molecular weight 9,000 Daltons; dosage 50-200 ppm.

Brines without treatment by the methods and/or by the formulations disclosed herein:
- may include hazy water,
- may have relatively heavy precipitation of FeS
- may have a microbial (e.g., bacterial) count of about 4-5 million,
- can be filtered with a 1.2 micron Millipore filter at a rate of 1000 ml in 5 minutes,
- may have 50 ppm $H_2S$ in the brine water.

Brines treated using the methods and/or by the formulations disclosed herein (e.g., using the formulation at a dose of 50 ppm show water clear, slight precipitation of FeS after one hour, a microbial count 59,000, filtration rate of 2500 ml in 5 minutes with a 1.2 micron Millipore filter, and 32 ppm $H_2S$ in the brine water.

Brines treated using the methods and/or by the formulations disclosed herein (e.g., using the formulation at a dose of 100 ppm show water clear, no precipitation of FeS after 24 hours, a microbial count 38,000, filtration rate of 3000 ml in 5 minutes with a 1.2 micron Millipore filter, and 30 ppm $H_2S$ in the brine water.

EXAMPLES

Hydrogen sulfide brine samples were taken from a primary treater system fed by a series of oil wells located in the Williston Basin. This system was plagued by iron sulfide scale throughout its history. The analysis of the brine is given in Table 1.

TABLE 1

Analysis of Brine

| Item | Level |
|---|---|
| Sodium | 6950 mg/L |
| Potassium | 410 mg/l |

TABLE 1-continued

Analysis of Brine

| Item | Level |
| --- | --- |
| Magnesium | 400 mg/L |
| Calcium | 1055 mg/l |
| Strontium | 38 mg/l |
| Barium | 0.26 mg/L |
| Iron | 2.0 mg/L |
| Chloride | 22000 mg/L |
| Sulfate | 450 mg/l |
| pH | 6.11 |

A commonly used analytical method to determine the presence and amount of iron sulfide scale is referred to as the Millipore-Time Filtration Method. A volume of brine sample is passed through a 1.2 micron Millipore filter in a given time, such as five minutes. As suspended iron sulfite scale begins to collect on the filter, the volume of brine decreases. A greater volume of brine through the filter in a specified amount of time indicates limited or little blockage of the filter. The presence of FeS is indicated by the color of the water and analytical characterization of black solids on the filter. Subsequent elemental analysis identifies the presence of iron sulfide.

The information from the Millipore-Time Filtration Method is given below in Table 2.

TABLE 2

Information from the Millipore-Time Filtration Method Five (5) minutes through 1.2 microns

| Treatment | Appearance | Volume of Brine (ml) |
| --- | --- | --- |
| No treatment | Hazy | 500 |
| 20 ppm DL-aspartic acid polymer | Clear | 2500 |
| 40 ppm DL-aspartic acid polymer | Clear | 3000 |

The increase in the Millipore filtration volume over time is shown in FIG. 1. The mean filtration volume prior to the application of DL-aspartic acid polymer was 800 mL. The mean filtration volume after the program start was 2925 mL, an increase of 2125 ml. The increase in the filtration volume is directly related to the inhibition of iron sulfide scale.

With respect to brine clarity, this particular brine taken from the primary treater was always characterized as being hazy with a variety of particles. The treatment of the brine with DL-aspartic acid polymer demonstrates the effect of its ability to inhibit and prevent the formation of iron sulfide.

Examples of the ability of DL-aspartic acid polymer to develop and maintain a stable dispersion were found in treating a knockout treater at the same operator site. Several produced water sources saturated with hydrogen sulfide come together at the knockout treater and are further treated to reduce turbidity, dissolved solids and iron sulfide. This water had varying turbidity and showed the presence of iron sulfide particles that settled out. The initial dosage of DL-aspartic acid polymer was at lower feed rates and water samples were taken over a nine day period. Table 3 shows stable turbidity with suspended particles over time.

TABLE 3

Dispersed Iron Sulfide Observations

| Treatment | Turbidity | Particles | Color |
| --- | --- | --- | --- |
| Untreated | medium | +++++ | Black |
| Sample 1 Day 1 | medium | +++ | Black |
| Sample 2 Day 4 | slight | ++ | Black |
| Sample 3 Day 9 | slight | + | Black |
| Sample 2 Day 64 | slight | ++ | Black |
| Sample 3 Day 64 | slight | + | Black |

The initial water samples taken from the knockout treater were at about 70 degrees Celsius. Review of the same water samples over two months later at 22 degrees Celsius showed a continuing stable haze or turbidity coupled with stabilized suspended particles (more particles is indicated by more plus signs) and no settling demonstrating a good long term dispersion.

The same brine samples taken from the primary treater were also analyzed for microbial counts and hydrogen sulfide gas. The analysis of the microbiological activity and hydrogen sulfide gas are shown in Table 4.

TABLE 4

Microbiological Activity in Presence of Polymers

| Treatment | Microbiological Counts (cfu/mL) | Hydrogen Sulfide (ppm) |
| --- | --- | --- |
| No Treatment | 5,000,000 | 50 |
| 20 ppm DL-aspartic acid polymer | 59,000 | 32 |
| 40 ppm DL-aspartic acid polymer | 38,000 | 30 |

The microbiological activity was obtained using an assay involving an adenosine triphosphate (ATP) field test method. ATP is found in all living species and can be observed by the reaction of a naturally-occurring firefly enzyme, luciferase in the sample. The luminescence determined is detected by a luminometer. There is a direct relationship between the light produced and the amount of microbiological species present in the sample. The use of ATP to determine the microbiological activity is rapid and detects a wide variety of microbiological species, since all microbiological species contain ATP.

Hydrogen sulfide gas is analyzed by a Shimadzu gel permeation chromatograph of the filtered brine. 20 micrometers of brine sample is injected at 30 degrees Celsius and area under the curves are measured against a standard brine.

The data in Table 3 demonstrates the ability of DL-aspartic acid polymer to influence microbial growth and its production of hydrogen sulfide gas.

What is claimed is:

1. A method for preventing and inhibiting the formation of iron sulfide in hydrocarbon producing wells, the method comprising:
   treating an actively-producing hydrocarbon well with an additive;
   wherein treating the actively-producing hydrocarbon well includes adding the additive to a production fluid of the actively-producing hydrocarbon well; and
   wherein the additive includes a DL-aspartic acid polymer.
2. The method of claim 1, wherein the monomer used in the DL-aspartic acid polymer is L-aspartic acid.
3. The method of claim 1, wherein the DL-aspartic acid polymer is an α, β, DL-aspartic acid polymer.

4. The method of claim 1, wherein the DL-aspartic acid polymer is produced from ammonia and maleic acid.

5. The method of claim 1, wherein the DL-aspartic acid polymer is produced from polysuccinimide.

6. The method of claim 1, wherein the DL-aspartic acid polymer is an amine derivative of aspartic acid.

7. The method of claim 6, wherein the amine is a primary amine.

8. The method of claim 1, wherein the DL-aspartic acid polymer is a block copolymer or a co-polycondensates with condensable moities.

9. The method of claim 1, wherein the DL-aspartic acid polymer is in the alkali metal salt form.

10. The method of claim 1, wherein the DL-aspartic acid polymer has a weight average molecular weight of 1,000-100,000 Daltons.

11. The method of claim 1, wherein the DL-aspartic acid polymer has a weight average molecular weight of 5,000-15,000 Daltons.

12. The method of claim 1, wherein the DL-aspartic acid polymer has a weight average molecular weight of 8,000-11,000 Daltons.

13. The method of claim 1, wherein the DL-aspartic acid polymer-containing formulation is designed to be fed at a dosage of 10-1000 ppm.

14. The method of claim 1, wherein the DL-aspartic acid polymer-containing formulation is designed to be fed at a dosage of 25-500 ppm.

15. The method of claim 1, wherein the DL-aspartic acid polymer containing formulation is designed to be fed at a dosage of 50-300 ppm.

16. The method of claim 1, wherein the additive further comprises acetic acid, oxalic acid, lactic acid, citric acid, uric acid, or benzoic acid in water.

17. A method for dispersing the formation of iron sulfide in hydrocarbon producing wells, the method comprising:
disposing a formulation in a production fluid of an actively-producing hydrocarbon well to disperse the formation of iron sulfide in the actively-producing hydrocarbon well, the formulation including a DL-aspartic acid polymer.

18. A method for reducing microbial counts, the method comprising:
disposing a formulation in a hydrocarbon producing well to reduce microbial counts in the hydrocarbon producing well, the formulation including a DL-aspartic acid polymer.

19. The method of claim 18, wherein the DL-aspartic acid polymer has a weight average molecular weight of 8,000-11,000 Daltons.

20. The method of claim 18, wherein the formulation is disposed in the well at a dosage of 50-300 ppm.

* * * * *